United States Patent [19]

Lahmeyer

[11] 3,893,353
[45] July 8, 1975

[54] DRILL AND METHOD OF PRODUCING THE SAME

[75] Inventor: Hermann Lahmeyer, Bollen, Germany

[73] Assignee: Gebrueder Heller, Uphusen, Germany

[22] Filed: Nov. 17, 1971

[21] Appl. No.: 199,574

[30] Foreign Application Priority Data
Dec. 28, 1970 Germany............................ 2064024

[52] U.S. Cl............................................... 76/108 T
[51] Int. Cl................................................. B21r 5/04
[58] Field of Search............... 72/38; 76/108, 101 E; 29/423

[56] References Cited
UNITED STATES PATENTS

| | | | |
|---|---|---|---|
| 344,754 | 6/1886 | Stetson | 76/108 T |
| 1,151,247 | 8/1915 | Denk | 76/108 R |
| 2,405,298 | 8/1946 | Fleischer | 76/108 T |
| 2,541,849 | 2/1951 | Villeneuve | 76/108 T |
| 2,733,943 | 2/1956 | Nater | 76/108 R X |
| 2,881,517 | 4/1959 | Carpenter et al. | 29/423 |
| 2,901,932 | 9/1959 | Erdelyi | 76/108 R X |
| 2,903,921 | 9/1959 | Andreasson | 76/108 R X |
| 3,010,345 | 11/1961 | Wagner | 76/108 R X |
| 3,085,453 | 4/1963 | Mossberg | 76/108 R |
| 3,365,922 | 1/1968 | Conces et al. | 72/38 |
| 3,504,575 | 4/1970 | Makino et al. | 76/108 R |
| 3,555,935 | 1/1971 | Dorrenberg | 76/108 T |

FOREIGN PATENTS OR APPLICATIONS

| | | | |
|---|---|---|---|
| 657,586 | 9/1951 | United Kingdom | 76/108 |
| 830,389 | 3/1960 | United Kingdom | 29/423 |

*Primary Examiner*—Roy D. Frazier
*Assistant Examiner*—Lawrence J. Staab

[57] ABSTRACT

The production of fluted drills from tubular cylindrical blanks preferably by cold-rolling so as to press at least one spiral chip flute into the blank by means of rotating pressure rollers and thereby displacing the material of the part of the blank into which the flute is impressed so as either to increase the length of the drill over the length of the original blank or to increase the diameter of the fluted part of the drill over the original diameter of the blank the untreated end portion of which remains cylindrical for clamping the drill in a tool holder. Although the rolling operation for producing the flutes also varies the shape of the bore in the blank, this bore will not be closed and its cross-sectional size will remain substantially the same as that of the bore in the blank and it may be used as a channel for passing a coolant to the cutting end of the drill which may consist of a suitably shaped plate of tempered steel or the like which may be hard-soldered to the end of the drill.

11 Claims, 10 Drawing Figures

PATENTED JUL 8 1975 3,893,353
SHEET 1

DRILL AND METHOD OF PRODUCING THE SAME

The present invention relates to a drill at least one end portion of which is provided with at least one spiral chip-removing flute by a remolding or upsetting operation which causes a structural deformation of the material of the blank.

The remolding or upsetting operation herein referred to is one in which such a high pressure is exerted upon a blank that its structure as well as its shape will be considerably changed which may also be rendered visible by grinding tests of the flow lines of the material. This operation is to be clearly distinguished from one in which the shape of sheet-metal parts is changed without, however, substantially affecting the thickness of the sheet material.

Drills of the above-mentioned type have in the past been produced for being used as rock drills in which the chip flutes are formed by cold-rolling a solid cylindrical material. Such a cold-rolling operation requires the application of extremely high forces and it also has the disadvantage that near the axis of the drill extreme internal stresses occur which often result in an internal destruction of the structure of the material since the cohesion of the fibers of the material near the center of the drill will be destroyed by the high internal stresses.

It is an object of the present invention to provide a drill which has at least one chip flute which is produced by deforming, remolding or upsetting the structure of the material of the drill blank under a mechanical pressure by suitable provisions which eliminate entirely the danger of an internal destruction of the material of the drill blank.

For attaining this object, the invention provides that the blank from which the drill is made consists of a tubular member which has a considerable wall thickness as compared with the diameter of its axial bore. Although when the chip flute or flutes are impressed into the material of the blank, the cross-sectional shape of this bore is also changed, it will not be closed by the compression of the blank to produce the flutes but will remain of substantially the same cross-sectional size in the finished drill and form a continuous axial channel through which, if desired, a coolant or other liquid may be passed to the cutting end of the drill. Aside from this purpose of the channel, it is the most important object and advantage of providing the cylindrical drill blank with such a bore that under mechanical pressure the wall of the blank may be changed considerably in shape and dimensions and arbitrarily in accordance with the manner in which the pressure is being applied, and that this may be done without danger that the internal structure of the blank material, although remolded, will not be harmed. The provision of the axial channel in the drill will not affect the use of the drill in those cases in which no channel for a coolant or the like is needed or desired, for example, if the drill is to be used as a rock drill. Although the drill blank preferably has a cylindrical shape, it may also have a different shape, for example, a square cross section.

According to the U.S. Pat. No. 2,817,983, the flutes are produced by cutting operations, for example, by grinding or milling. Therefore, the remaining material of the wall of the drill has an interrupted grain structure which weakens the wall strength of the drill so that, if the drill is subjected to high stresses in a drilling operation, the material intermediate the bottoms of the flutes and the channel may easily break. Therefore, the torque and thus also the power of the drill must be limited considerably which has the result that the cutting feed of the drill at each revolution thereof as well as other performance data of the drill cannot exceed certain limits. Moreover, because of its bore or channel, the flutes of this drill can only be made relatively shallow. This, in turn, means that the cross-sectional size of the flutes may be insufficient for the removal of the chips and that the flutes may be therefore clogged which may easily cause the drill to break.

It is a further disadvantage of the drills which are produced by the above-mentioned known method from tubular blanks that the shanks of these drills always have a diameter which is equal to the diameter of the tubular blank. Therefore a blank of one diameter cannot be used for producing a drill of a different diameter.

All of these disadvantages of the known types of drills which are made of tubular blanks will be eliminated by the drills which are produced by the method in accordance with the invention. The tubular blanks for producing these drills may have any desired wall thickness. The structural deformation of the tubular blank for providing it with at least one chip flute does practically not reduce its resistance to torsion since this deformation does not interrupt the grain structure of the material of the drill wall and it also causes the bore of the tubular blank to be deformed so that the strength of the wall of the drill at the base or bottom of the flute or flutes will be only immaterially lower than the strength of the wall of the original tubular blank, while the back of the drill which is especially important for the resistance of the drill to torsion has a wall of a greater strength. The drill according to the invention may therefore be made of a tubular blank with a thick wall similar to the blank for a drill as disclosed by the U.S. Pat. No. 2,817,983, but whereas the strength of the wall remaining in a drill according to this patent at the base of a flute is considerably reduced since the flute is produced by milling or grinding, the structural deformation of the tubular blank in accordance with the invention causes the wall of the new drill at the base of each flute to have practically the same strength as if the drill was not provided with any flutes.

A drill which is made by a structural deformation or remolding of a tubular blank in accordance with the invention has the further advantage over the known drills as previously described which are likewise made of tubular blanks that such a deformation may be controlled so that the material which is displaced when the flutes are being formed may be utilized either for increasing the length of the original drill blank or for increasing its outer diameter. This, in turn, permits tubes of a certain outer diameter to be remolded so as to form drills of different outer diameters.

A further unexpected advantage which is attained by the present invention is the fact that, even though the continuous axial channel in the new drill has a shape different from the shape of the bore in the original tubular blank, its cross-sectional area is only slightly smaller than that of the bore in the blank. This channel therefore permits substantially the same amount of coolant and under substantially the same pressure to be passed to the small nozzle-like outlet openings at the cutting end of the dril drill through the original bore of the blank. While the new drill has substantially the same resistance to torsion and bending as if it was not provided with any flutes, the known drills which were made of tubular blanks could have an adequate resistance to torsion and bending only if their axial channel was made of such a small cross-sectional size that their walls would be sufficiently thick. This, however, meant that the coolant had to be passed under a high pressure through the channel to the small nozzle-like outlet openings. The much higher resistance of the new drill to torsion and bending as compared with the known drills which are made of tubular blanks also means that the drill has less inclination to yield radially while drilling a bore, that it permits a higher feed per revolution, and that it insures that the bores drilled will be as accurate as possible and practically without any deviation from the desired size.

The present invention can also not be regarded as obvious by a person who is familiar with the prior art. Since such a person knew prior to this invention that extremely high forces occur when cold-rolling the flutes or rock drills as previously described, he had to assume that when cold-rolling a tubular blank which has a relatively thin axial bore, this bore would be mashed and completely closed by the high pressures which are exerted by the cold-rollers upon the tubular blank. This result had to be also assumed especially in view of the fact that the volume of the flutes which have to be impressed into the tubular blank amounts to a multiple of the volume of the bore in the original blank and that the material which is displaced from the flutes is forced toward the interior of the tubular blank by the rollers which act upon the latter in radial directions. Even an expert in the art therefore had to assume that the material of the tubular blank which is displaced in the formation of the flutes would at first close the bore in the blank completely and that only thereafter the remainder of the displaced material might lead to an increase in length or thickness of the drill shank. However, as unbelievable as it may seem, the numerous tests which were carried out by the inventor have proved that the structural deformation according to the invention will practically not reduce the cross-sectional area of the original bore in the tubular blank but will only change its cross-sectional shape so that an axially continuous channel remains when the deforming operation is completed.

The method according to the invention of structurally deforming a tubular blank at least at one end thereof so as to form at least one chip flute may be carried out very quickly and economically. If the structural deformation of the tubular blank is carried out, for example, by a conventional cold-rolling operation, it is possible to produce a drill within a period of 0.3 to 2 seconds, depending upon the diameter of the drill.

The features and advantages of the present invention will become more clearly apparent from the following detailed description thereof which is to be read with reference to the accompanying drawings, in which —

FIGS. 8 and 9 show a side view and an end view of a drill according to a modification of the invention; while

Figure 1:
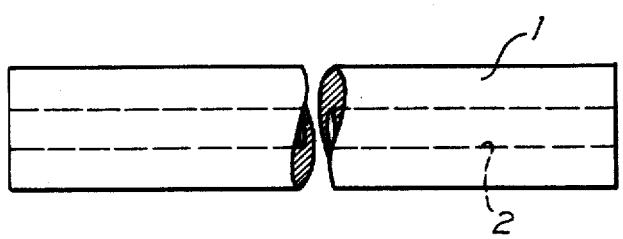
FIGS. 1 and 2 show a side view and an end view of a tubular blank from which a drill according to the invention is to be produced.
Figure 2:
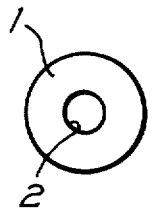
Figure 3:
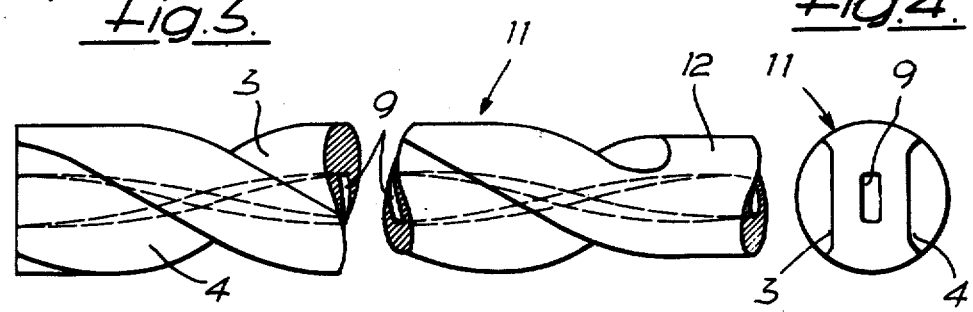
FIGS. 3 and 4 show views corresponding to FIGS. 1 and 2, respectively, of the blank after the same has been structurally deformed in accordance with the new method.
Figure 4:
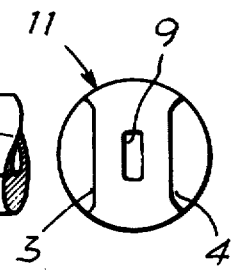
Figure 5:
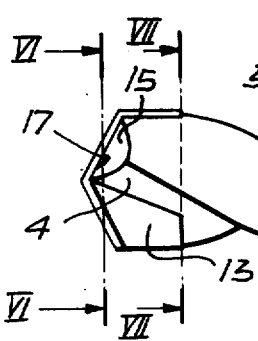
FIG. 5 shows a side view of a drill which has been produced from the structurally deformed blank as shown in FIGS. 3 and 4.
Figure 10:
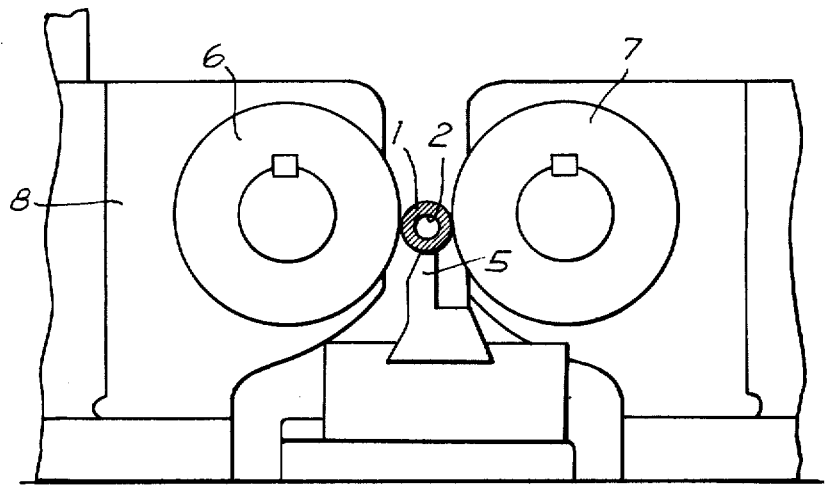
FIG. 10 shows a diagrammatically simplified side view of an apparatus for cold-rolling the tubular blank as shown in FIGS. 1 and 2.

In the drawings, FIGS. 1 and 2 show a tubular blank 1 which has a thick wall and a thinner axial bore 2 and is subsequently provided by cold-rolling in an apparatus as illustrated in FIG. 10 with two diametrically opposite chip-removing flutes 3 and 4 as shown in FIGS. 3 to 5. The cold-rolling apparatus is for this purpose provided with a guide bar 5 on which the tubular blank 1 is supported between two rollers 6 and 7 at such a height that the longitudinal axis of blank 1 will be disposed slightly below the plane which connects the parallel longitudinal axes of the rollers 6 and 7. These rollers 6 and 7 consist of tempered tool steel and have a length at least equal to the length of the spiral flutes 3 and 4 which are to be rolled into the blank 1. Rollers 6 and 7 are provided with ribs, not shown, which are negatives of the flutes 3 and 4 to be produced. The distance between these ribs on rollers 6 and 7 depends upon the diameter of the particular drill to be produced and it decreases if the drill is made of a smaller diameter. The pitch of the spiral flutes 3 and 4 is largely determined by the angle which the ribs on rollers 6 and 7 form on the axes of the latter. Both rollers 6 and 7 are to be driven at equal speeds and in the same direction of rotation, but the corresponding ribs of the two rollers must be disposed exactly opposite to each other. Roller 6 is mounted in the frame 8 of the rolling apparatus so as to be rotatable about its axis but immovable in its axial direction, whereas roller 7 is rotatably mounted in frame 8 but so as to permit its axis to be shifted in a direction parallel to the axis of roller 6 and within a plane slightly below that which connects the axes of both rollers.

The cold-rolling operation on the tubular blank 1 is carried out in the following manner: The two rollers 6 and 7 rotate in the same direction, while blank 1 lies between them on the guide bar 2. Roller 7 is then shifted in the direction toward roller 6 whereby blank 1 is pressed by roller 7 against the roller 6. Due to the rotation of rollers 6 and 7, blank 1 is likewise rotated. The pressure with which roller 7 presses blank 1 against roller 6 then forces the ribs on the two rollers into the material of the blank and these ribs thus form the spiral flutes 3 and 4 in blank 1. The material of the blank is thereby structurally displaced or deformed and thoroughly kneaded. The pressure with which roller 7 is pressed against blank 1 is adjustable so as to control the amount of deformation. The cold-rolling operation is completed when the pressure upon blank 1 equals the pressure with which the blank opposes a further deformation or when roller 7 has been shifted to a predetermined distance from roller 6.

In numerous tests it has been found that if the outer diameter of blank 1 is sufficient, the bore 2 of the blank will not be fully compressed and closed, but will only be deformed in the manner as illustrated in FIG. 4. The lower limit of the outer diameter of a blank 1 at which there is no danger that bore 2 might be closed amounts to approximately 6mm. The relation of the thickness of the wall of the tubular blank to the size of its diameter may be varied considerably.

In order to insure that, when the blanks 1 have a smaller or very small diameter, the bore 2 will not be closed when the flutes 3 and 4 are impressed by cold-rolling, it is advisable to insert into the bore 2 a wire of a diameter smaller than that of the bore and of a greater length than that of the blank, and to pull this wire out of the bore at the end projecting from the blank after the flutes have been formed. Unexpectedly it has been found that for pulling out this wire, a relatively small force is required and that the structural deformation of the blank will not damage or sever the wire.

As illustrated in FIG. 3, result of the cold-rolling deformation the shank of the drill which is then formed will have an outer diameter considerably larger than that of the original tubular blank 1. However, the rolling operation will reduce the strength of the wall of the drill shank at the base of the flutes only slightly as compared with the strength of the wall of the original blank 1. As may be seen especially in FIG. 4, the structural deformation of blank 1 by the rollers 6 and 7 to press two diametrically opposite spiral flutes 3 and 4 into the blank also deforms the originally round bore 2 into a channel 9 of a substantially rectangular cross section. The longitudinal axes of the cross sections of this channel 9 then extend within an axial but spirally wound surface the straight generatrices of which extend vertically to the longitudinal axis of the drill shank and substantially parallel to the base of the flutes 3 and 4. Channel 9 is therefore spirally wound about its own axis in accordance with the pitch of flutes 3 and 4.

When the cold-rolling operation of flutes 3 and 4 in blank 1 has been completed, a drill 11 will be attained as illustrated in FIG. 3, which has an axially continuous channel 9. Flutes 3 and 4 then extend up to the left end of the drill blank 11, while the right end retains the original circular cross section and the original diameter of blank 1 and forms the part 12 of the drill shank which is to be clamped by a chuck or the like. This part 12 has a diameter smaller than the part 11 of the drill shank which is provided with the flutes 3 and 4.

Figure 6:
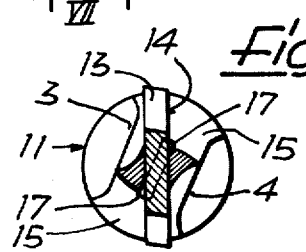
FIGS. 6 and 7 show cross sections which are taken along the lines VI — VI and VII — VII of FIG. 5, respectively.
Figure 7:
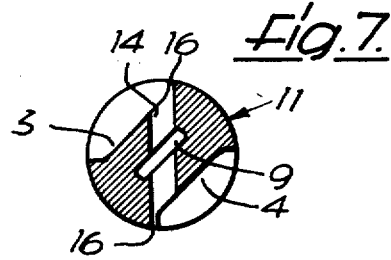

As illustrated in FIG. 5, the left end of the drill blank 11 is then prepared in a conventional manner by a cutting operation for securing a hard metal cutting plate 13 thereto. This end of the drill blank 11 is for this purpose provided with a diametrical slot 14 for receiving the cutting plate 13 and with surfaces 15 which are inclined relative to the axis of the drill and to the central plane of the slot 14. As illustrated in FIG. 7, the central plane of the diametrical slot 14 then connects at its base two diametrically opposite edges 16 which are formed by the connection between the flutes 3 and 4 and the outer surface of the drill shank. On these edges 16 the drill shank has its greatest wall thickness so that the cutting plate 13 will be very securely supported on the base of slot 14 against any stresses which are exerted upon this plate in the axial direction of the drill. Slot 14 is made of such a depth in relation to the pitch of flutes 3 and 4 that at the part where the cutting plate 13 projects from slot 14 the longitudinal axis of the cross section of channel 9 forms such an acute angle to the central plane of slot 14 that only the diametrically opposite edges 17 of channel 9 project laterally slightly beyond the slot 14 (see FIG. 6) and thus form very small nozzlelike outlet openings for the coolant. This has the advantage that no chips which might clog the flow of the coolant will adhere to these outlet openings. An even greater advantage which is hereby attained, especially in view of the strong torques occurring in such drills, is that the side walls of slot 14 which are only interrupted by the narrow channel 9 support the cutting plate 13. The particular arrangement of slot 14 in combination with the elongated cross section of channel 9 as previously described results in the advantage that the cutting plate 13 will be very firmly secured at its base against axial forces and that its part projecting from slot 14 will be highly resistant to torsion. In the event that the cornerlike edges 17 might be too small for forming outlet openings of a sufficient size for the passage of the coolant, they may be easily enlarged before the hardmetal cutting plate 13 is inserted.

Figure 8:
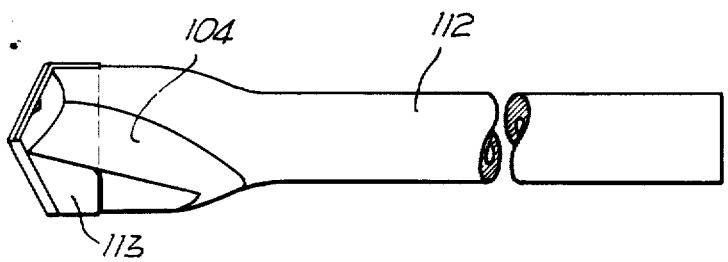
Figure 9:
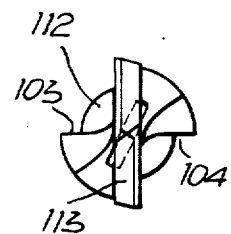

FIGS. 8 and 9 illustrate a modification of the drill according to the invention. In this drill, only the left end portion of the shank 112 is provided with chip flutes 103 and 104. The tubular blank from which this drill is produced has originally an outer diameter equal to that of the cylindrical shank part 112 at the right side of FIG. 8 the bore of which also retains its circular cross section when the drill is completed. By means of the pressure rollers 6 and 7 as shown in FIG. 10, the material of the left part of this blank is subjected to such a strong structural deformation that relatively short but deep flutes 103 and 104 will be impressed and this part will thereby be considerably increased in diameter. Intermediate this thick fluted part and the free end portion of the cylindrical shank part 112, which is to be clamped by a chuck or the like, an annular part of the same diameter as the clamped part will then remain, through which the coolant which is supplied first through the circular bore of the shank part 112 and then through the deformed bore in the thicker drill part to the cutting plate 113 of the drill will pass. The coolant will be discharged together with the chips after passing through the flutes 103 and 104.

Although the structural deformation of tubular blanks to produce drills is preferably carried out by cold-rolling in the manner as previously described because the drills which are thus produced have a very high solidity and strength, other types of structural deformation, for example, by drop forging or hammering may also be employed. Since the deformation of the blanks may also be carried out while their material is hot, it may in such cases be advisable to fill the bore of the tubular blank with an inert gas in order to prevent a corrosion of the wall of this bore and of its extension in the form of the channel 9. If, as previously stated, a tubular blank which is to be deformed to produce a drill has a smaller diameter, the bore 2 of such a blank may first be filled out by inserting a wire therein. Instead of inserting a single wire, it is also possible to insert two or more wires so that, for example, two channels 9 will be formed. In place of a wire, another substantially incompressible material, for example, a liquid or a pulverized material, may be employed.

It is a particular advantage of the method according to the present invention that it also permits the production of drills with clamping shanks 12 or 112 of the same diameter but with fluted parts the diameters of which may be varied within certain limits.

When drills of any kind are required to be of a very high accuracy, it is sometimes not possible to mount the shank of such a drill in a chuck, collet or similar tool holder. In such a case, the solid end of the drill is often inserted into a bore of a tool holder which has a diameter exactly corresponding to the diameter of this end and the inserted end is then secured in this bore, for example, by worm screws. Since the solid shank part of such a drill of a conventional type has usually substantially the same diameter as the fluted part, thereof, a change of the drill for one of a slightly different diameter also requires a different tool holder. When employing drills which are made in accordance with the invention, it is, however, possible to provide all drills with solid clamping shanks of the same diameter, even though their fluted parts may within certain limits be made of different outer diameters. Therefore, all of these drills may be mounted in the bore of the same tool holder of the type as last described.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A method of producing a drill having a shank with a first longitudinal axis, a cutting end, a single channel coaxially extending along said first longitudinal axis, and at least one chip-removing flute extending from said cutting end in the outside surface and at least along a portion of the length of said shank, comprising the steps of supporting a tubular blank having a substantially cylindrical wall surrounding a bore of a substantially circular cross section which is coaxial with said blank, filling out said bore with a gaseous filling material, impressing said chip-removing flute into said blank by structurally deforming the material of said wall along at least a portion of the length of said blank by rolling said portion of said blank between two rollers, shifting one of said rollers in the direction toward the other of said rollers so that said portion of said blank is pressed to form said shank with said chip-removing flute thereby increasing at least one outer dimension of said portion by at least a part of the material being displaced by impressing said flute, thereby also deforming said bore in said portion so that said coaxial channel in said portion has elongated cross sections of substantially identical areas substantially coaxial with said first longitudinal axis, and cutting said deformed portion of said blank to form said cutting end.

2. A method as defined in claim 1, in which two of said flutes are impressed diametrically opposite to each other into said wall and said bore is thereby deformed so as to have substantially rectangular cross sections at spaced locations along said first longitudinal axis.

3. A method as defined in claim 2, in which the wall of said drill has its greatest thickness between said flutes and the edges of the cylindrical parts of the outer surface of the drill.

4. A method as defined in claim 1, in which by impressing said flute into said blank, the material into which said flute is impressed is displaced in the longitudinal direction of said blank so as to increase the length thereof.

5. A method as defined in claim 1, in which by impressing said flute into said blank, the material into which said flute is impressed is displaced so as to increase the outer diameter of the portions of said blank which are adjacent to both lateral sides of said flute.

6. A method of producing a drill as defined in claim 5, in which said flute is impressed only into a portion of the length of said blank and the fluted part thus formed has a larger outer diameter than the remaining unfluted part.

7. A method of producing a drill as defined in claim 1, further comprising the steps of filling out said bore in said blank with said filling material before deforming at least a portion of the length of said blank and removing said filling material from said bore after the deformation of said blank.

8. A method as defined in claim 7, wherein said filling material consists of an inert gas.

9. A method as defined in claim 1, in which at least a part of the length of said blank is deformed by cold-rolling the same.

10. A method according to claim 1, comprising the steps of cutting a slot in said cutting end so that said slot crosses said elongated cross section at the end of said axial channel in such a way that the ends of said elongated cross section extend at opposite sides thereof beyond said slot, and securing a cutting plate in said slot so that said ends of said elongated cross section form a pair of opposite nozzles which exit from said axial channel at opposite sides of said cutting plate.

11. A method as defined in claim 2, in which said flutes are impressed into said blank so as to extend spirally about said first longitudinal axis of said shank, each of said rectangular cross sections having a second longitudinal axis which divides the rectangular cross-section into symmetrical halves, said second longitudinal axes of successive ones of said cross-sections of said channel forming a surface spirally twisting in one direction about said first longitudinal axis of said shank and each one of said second longitudinal axes of said elongated cross-sections of said channel extending substantially parallel to the bottom of a corresponding section of each of said flutes.

* * * * *